(12) United States Patent
Schlansker et al.

(10) Patent No.: US 10,048,440 B2
(45) Date of Patent: Aug. 14, 2018

(54) PHOTONIC INTERCONNECT INCLUDING A CYCLIC ARRAYED WAVEGUIDE GRATING

(71) Applicant: Hewlett Packard Enterprise Development LP, Houston, TX (US)

(72) Inventors: Mike Schlansker, Los Altos, CA (US); Jean Tourrilhes, Mountain View, CA (US); Michael Renne Ty Tan, Menlo Park, CA (US); Joaquin Matres, Palo Alto, CA (US); Wayne Victor Sorin, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/500,560

(22) PCT Filed: Jan. 29, 2015

(86) PCT No.: PCT/US2015/013518
§ 371 (c)(1),
(2) Date: Jan. 31, 2017

(87) PCT Pub. No.: WO2016/122527
PCT Pub. Date: Aug. 4, 2016

(65) Prior Publication Data
US 2017/0227714 A1 Aug. 10, 2017

(51) Int. Cl.
*G02B 6/12* (2006.01)
*G02B 6/42* (2006.01)
(Continued)

(52) U.S. Cl.
CPC ......... *G02B 6/12019* (2013.01); *G02B 6/124* (2013.01); *G02B 6/12009* (2013.01);
(Continued)

(58) Field of Classification Search
CPC ...... G02B 6/12019; G02B 2006/12164; G02B 6/12007; G02B 6/12009; G02B 6/12014;
(Continued)

(56) References Cited

U.S. PATENT DOCUMENTS 4,834,483 A * 5/1989 Arthurs .............. H04Q 11/0001
385/46
7,016,608 B1 * 3/2006 Ball .................... H04J 14/0204
398/58
(Continued)

OTHER PUBLICATIONS

"APSS Apollo Application Note on Array Waveguide Grating (AWG) Design, simulation and layout APN-APSS-AWG," Apollo Photonics, Apollo Inc., document revision: Jul. 15, 2003, (24 pages), available at www.apollophotonics.com.
(Continued)

*Primary Examiner* — Jerry Rahll
*Assistant Examiner* — Michael Mooney
(74) *Attorney, Agent, or Firm* — Trop, Pruner & Hu, P.C.

(57) ABSTRACT

A photonic interconnect apparatus includes tunable light devices, multiplexers to multiplex optical signals produced by the tunable light devices onto optical paths, and a cyclic arrayed waveguide grating (AWG) to receive the optical signals over the optical paths, and to direct a given optical signal of the received optical signals to a selected output of a plurality of outputs of the cyclic AWG based on a wavelength of the given optical signal. A respective demultiplexer directs the given optical signal to a selected output of a plurality of outputs of the respective demultiplexer according to which coarse wavelength band the wavelength of the given optical signal is part of.

13 Claims, 6 Drawing Sheets

(51) Int. Cl.
*G02B 6/28* (2006.01)
*G02B 6/34* (2006.01)
*H04Q 11/00* (2006.01)
*H04J 14/00* (2006.01)
*G02B 6/124* (2006.01)
*H04J 14/02* (2006.01)

(52) U.S. Cl.
CPC .......... *H04J 14/02* (2013.01); *H04Q 11/0005* (2013.01); *G02B 2006/12164* (2013.01); *H04Q 2011/0016* (2013.01); *H04Q 2011/0018* (2013.01); *H04Q 2011/0032* (2013.01)

(58) Field of Classification Search
CPC ............... G02B 6/124; H04Q 11/0001; H04Q 11/0005; H04Q 11/0067; H04Q 2011/0016; H04Q 2011/0018; H04Q 2011/0032; H04J 14/02; H04J 14/0208; H04J 14/0209; H04J 14/0246; H04J 14/025; H01S 3/10
USPC .............. 385/14, 16–24, 37; 398/79–83, 89; 372/20
See application file for complete search history.

(56) References Cited

U.S. PATENT DOCUMENTS

| | | | |
|---|---|---|---|
| 7,272,309 B1 | 9/2007 | Tamil et al. | |
| 7,787,768 B2 | 8/2010 | Pichler et al. | |
| 2005/0031250 A1 | 2/2005 | Schroeder | |
| 2007/0098319 A1 | 5/2007 | Jennen | |
| 2009/0324221 A1 | 12/2009 | Neilson | |
| 2010/0054741 A1* | 3/2010 | Urino | H04J 14/02 398/79 |
| 2012/0328292 A1 | 12/2012 | Testa et al. | |
| 2013/0094528 A1* | 4/2013 | Ikagawa | H01S 3/10 372/20 |
| 2013/0136447 A1 | 5/2013 | Cavaliere et al. | |
| 2013/0287397 A1* | 10/2013 | Frankel | H04B 10/271 398/50 |
| 2013/0315599 A1 | 11/2013 | Lam et al. | |
| 2014/0029951 A1* | 1/2014 | Handelman | H04J 14/02 398/91 |
| 2014/0056371 A1 | 2/2014 | Ji et al. | |

OTHER PUBLICATIONS

"Clos network," Wikipedia, (5 pages), available at; retrieved Jan. 9, 2015 from http://enwikipedia.org/wiki/Clos_network.

Cheyns, J et al, "Clos lives on a Optical Packet Switching", Nov. 11, 2004.

Fey, D.; "Optical multiplexing techniques for photonic Clos networks in High Performance Computing Architectures," Springer Science+Business Media, LLC, J Supercomput (2012) 62:620-632 DOI 10.1007/s11227-010-0496-x, Nov. 16, 2010, (13 pages).

* cited by examiner

PHOTONIC INTERCONNECT INCLUDING A CYCLIC ARRAYED WAVEGUIDE GRATING

BACKGROUND

A system can include a large number of devices that are to communicate with each other. In some cases, communications among devices can be performed over a communication fabric that includes electrical communication media and communication nodes, such as routers and switches. In other cases, a communication fabric can alternatively or additionally include optical communication media and optical switch devices.

BRIEF DESCRIPTION OF THE DRAWINGS

Some implementations are described with respect to the following figures.

DETAILED DESCRIPTION

Photonic interconnect systems can be used to provide high-bandwidth optical communications over relatively long distances. A photonic interconnect system can include optical paths (implemented with optical fibers and/or optical waveguides) and optical devices (such as switches, gratings, etc.). A photonic interconnect system can be included in a communication fabric that supports optical communications among endpoint devices, such as desktop computers, notebook computers, tablet computers, smartphones, wearable devices, storage devices, appliances, and so forth.

Traditional photonic interconnect systems can use a large number of optical switches or can use complex optical switches. Such photonic interconnect systems can be expensive and can be difficult to maintain due to their complexity.

Figure 1:
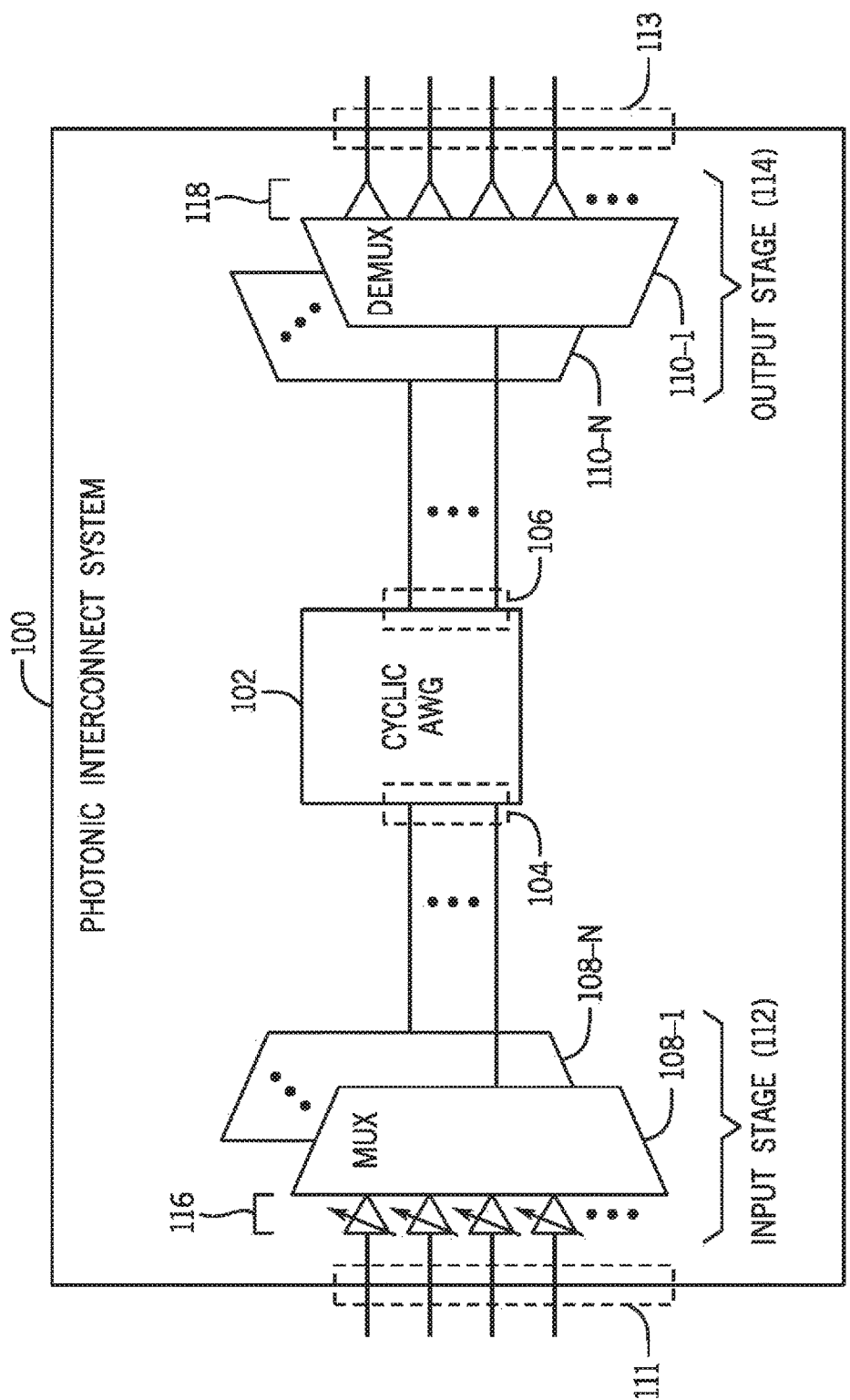
FIG. 1 is a block diagram of an example photonic interconnect system according to some implementations.

In accordance with some implementations according to the present disclosure, as shown in FIG. 1, a simplified photonic interconnect system 100 is provided that employs a cyclic arrayed waveguide grating (AWG) 102, which is an optical device that passes optical signals received at inputs 104 of the AWG 102 to selected outputs 106 of the AWG 102, according to wavelengths of the optical signals.

In some implementations, the cyclic AWG 102 has N inputs and N outputs, where N>1. The cyclic AWG 102 can be referred to as an N×N cyclic AWG 102. Optical signals are received at the inputs 104 of the cyclic AWG 102, and are passed through the internal optical paths (e.g. waveguides) of the cyclic AWG 102 to selected outputs 106 according to the wavelengths of the received optical signals.

For example, an optical signal having a first wavelength received at a first input of the cyclic AWG 102 can be distributed (or directed) to a first output of the cyclic AWG 102, an optical signal having a second wavelength received at the first input can be distributed to a second output of the cyclic AWG 102, an optical signal having a third wavelength received at the first input can be distributed to a third output of the cyclic AWG 102, and so forth. The foregoing pattern of distributing input optical signals having different wavelengths to corresponding outputs of the cyclic AWG 102 is referred to as a distribution pattern.

The different inputs of the cyclic AWG 102 can be associated with different distribution patterns. For example, an optical signal having a first wavelength received at a second input of the cyclic AWG 102 can be distributed to a second output of the cyclic AWG 102, an optical signal having a second wavelength received at the second input can be distributed to a third output of the cyclic AWG 102, an optical signal having a third wavelength received at the first input can be distributed to a fourth output of the cyclic AWG 102, and so forth.

The use of the different distribution patterns at the respective different inputs of the cyclic AWG 102 allows the cyclic AWG 102 to distribute an optical signal received at any of the inputs 104 to any of the outputs 106.

In accordance with some implementations of the present disclosure, to increase the number of inputs 111 and outputs 113 of the photonic interconnect system 100, multiplexers 108-1 to 108-N (collectively referred to as "multiplexers 108") are provided in an input stage 112 of the photonic interconnect system 100, and demultiplexers 110-1 to 110-N (collectively referred to as "demultiplexers 110") are provided in an output stage 114 of the photonic interconnect system 100. The cyclic AWG 102 is connected between the input and output stages 112 and 114.

Each multiplexer 108 (of 108-1 to 108-N) has M inputs (where M>1) and 1 output. The multiplexer 108 performs M:1 multiplexing, in which M inputs are multiplexed onto 1 output. Each demultiplexer 110 (of 110-1 to 110-N) has 1 input and M outputs. The demultiplexer 108 performs 1:M demultiplexing, in which 1 input is demultiplexed onto M outputs.

By employing the multiplexers 108-1 to 108-N and the demultiplexers 110-1 to 110-N in combination with the cyclic AWG 102, the number of inputs 111 and number of outputs 113 of the photonic interconnect system 100 is not restricted to just the number of inputs and outputs of the cyclic AWG 102, which provides greater scalability and efficiency. More specifically, by using the multiplexers 108 and the demultiplexers 110, the number of inputs 111 of the photonic interconnect system 100 can be M×N, and the number of outputs 113 of the photonic interconnect system 100 can be M×N.

The input stage 112 of the photonic interconnect system 100 also includes multiple tunable light devices 116 (e.g. tunable laser devices) that operate as electrical-to-optical (EO) converters for converting from input electrical signals (received from the inputs 111 of the photonic interconnect system 100) to input optical signals that are provided to inputs of the multiplexers 108.

The output stage 114 further includes optical-to-electrical (OE) converters 118 for converting from output optical signals (as output by the demultiplexers 110) to output electrical signals that are provided to the outputs 113 of the photonic interconnect system 100.

The photonic interconnect system 100 also includes a controller (not shown in FIG. 1 but depicted as 120 in FIG. 3) that can selectively tune the tunable light devices 116 to produce input optical signals of selected wavelengths, in response to input electrical signals received by the photonic interconnect system 100 at inputs 111. A tunable light device can refer to a light device, such as a laser device, that is controllable to vary the wavelength of an optical signal output by the light device to any of various different wavelengths within a specified range.

In response to a received input electrical signal, a given tunable light device 116 produces an input optical signal having a selected wavelength that is based on the tuning of the given tunable light device 116 performed by the controller. The selected wavelength of the produced input optical signal determines the path through the cyclic AWG 102 (to a selected output 106 of the cyclic AWG 102) and the path through the demultiplexer 110. By selectively controlling the tunable light devices 116, the controller is able to route an input electrical signal received at any input 111 of the photonic interconnect system 100 to any output 113 of the photonic interconnect system 100, in some implementations.

Effectively, the photonic interconnect system 100 implements an optical switch that can selectively route input signals received at the inputs 111 to outputs 113 of the photonic interconnect system 100.

The multiplexers 108, the cyclic AWG 102, and the demultiplexers 110 can be passive devices that are not actively controlled (such as by the controller) to perform signal switching. Thus, in accordance with some implementations, just the tunable light devices 116 are actively controlled by the controller. This further simplifies the design of the photonic interconnect system 100 according to some implementations.

Figure 2A:
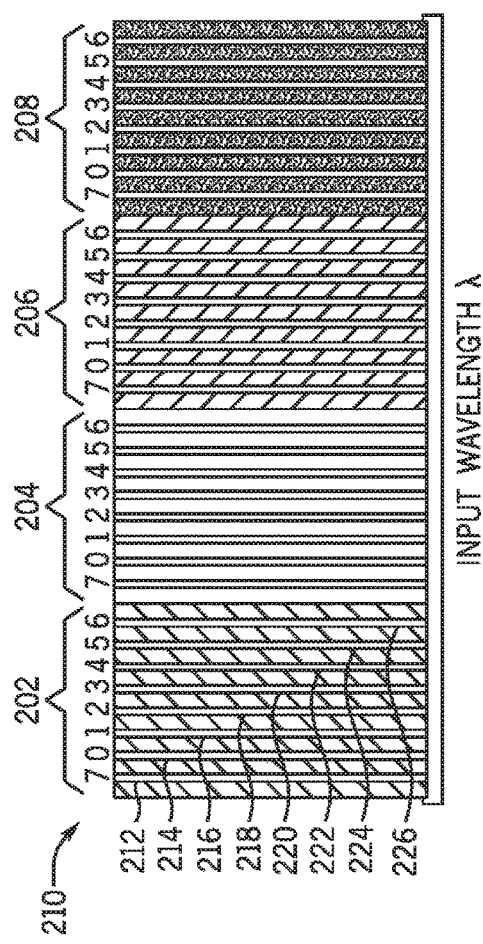
FIG. 2 is a schematic diagram illustrating coarse wavelength bands and fine wavelength bands within each coarse wavelength band, according to some examples.

FIG. 2A is a schematic diagram illustrating different wavelength bands. Each respective tunable light device 116 in FIG. 1 is controllable to produce an optical signal having a wavelength in any of the wavelength bands depicted in FIG. 2A. FIG. 2A shows four coarse wavelength bands (or more simply "coarse bands") 202, 204, 206, and 208. Each coarse band 202, 204, 206, or 208 has a respective set of fine wavelength bands (or more simply, "fine bands"). For example, the coarse band 202 has fine bands corresponding to wavelengths 212, 214, 216, 218, 220, 222, 224, and 226. The wavelengths 212, 214, 216, 218, 220, 222, 224, and 226 are wavelengths in respective fine bands of the coarse band 202.

In some implementations, a tunable light device 116 can be controlled by the controller to tune an input optical signal to any of the wavelengths depicted in FIG. 2A. FIG. 2A also shows a set of numbers 210 that represents a distribution pattern of wavelengths to respective outputs of the cyclic AWG 102. A number i=0, 1, 2, 3, 4, 5, 6, 7) identifies a respective output of the cyclic AWG 102. In the example of FIG. 2A, it is assumed that the cyclic AWG 102 has eight outputs (i.e. N=8). Thus, as shown in FIG. 2A, a first wavelength 212 maps to output 7 of the cyclic AWG 102. In other words, an input optical signal having the wavelength 212 received at an input of the cyclic AWG 102 is distributed by the cyclic AWG 102 to output 7 of the cyclic AWG 102.

FIG. 2A also indicates that the next successive wavelength 214 after the wavelength 212 maps to output 0 of the cyclic AWG 102. As further shown in FIG. 2A, the subsequent successive wavelengths 216, 218, 220, 222, 224, and 226 map to respective outputs 1, 2, 3, 4, 5, and 6 of the cyclic AWG 102.

The distribution pattern represented by {7, 0, 1, 2, 3, 4, 5, 6} in FIG. 2A is considered a cyclic pattern since the distribution pattern for a cyclic AWG device repeats in multiple coarse bands.

If the wavelength of an input optical signal is tuned to a wavelength in another coarse band, the distribution pattern represented by {7, 0, 1, 2, 3, 4, 5, 6} repeats. Thus, as shown in FIG. 2A, wavelengths in the fine bands of the coarse band 204 map to respective outputs 7, 0, 1, 2, 3, 4, 5, and 6 of the cyclic AWG 102. This distribution pattern is also repeated for the coarse bands 206 and 208.

Figure 2B:
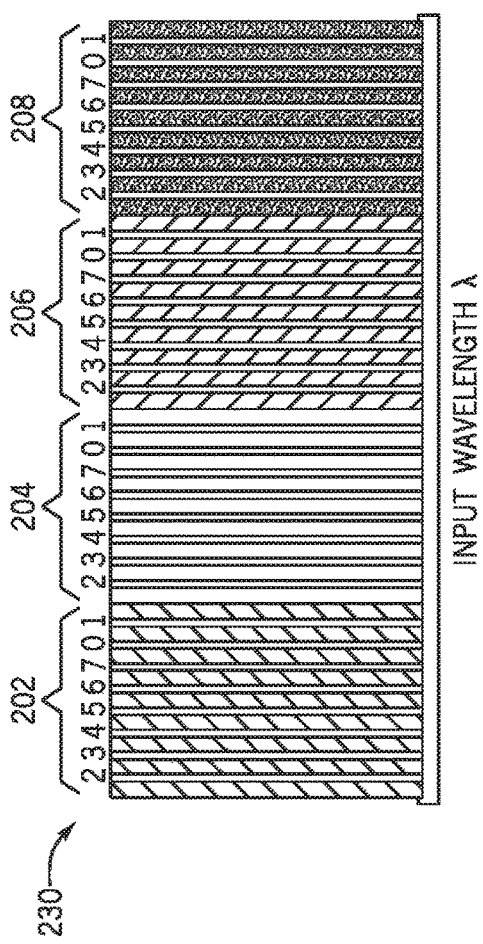

FIG. 2A depicts the distribution pattern (as represented by 210) for a specific input 104 of the cyclic AWG 102. Another input of the cyclic AWG 102 has a different distribution pattern, which is shown in FIG. 2B. In FIG. 2B, the distribution pattern 230 is as follows: {2, 3, 4, 5, 6, 7, 0, 1}. Successive fine band wavelengths in each coarse band map to outputs 2, 3, 4, 5, 6, 7, 0, and 1, respectively, of the cyclic AWG 102.

In some implementations, a coarse band is based on the bandwidth of a free spectral range of the cyclic AWG 102. For example, the coarse band can be approximately equal (to within some specified percentage) the bandwidth of the free spectral range of the cyclic AWG 102. In other examples, the coarse band can be larger than the bandwidth of the free spectral range of the cyclic AWG 102; for example, the coarse band can be approximately twice the bandwidth of the free spectral range of the cyclic AWG 102.

More generally, a coarse band can include at least the bandwidth of the free spectral range of the cyclic AWG 102 (in other words, the bandwidth of the coarse band is greater than or equal to the bandwidth of the free spectral range of the cyclic AWG 102). The free spectral range of an AWG is a characteristic of the AWG, and can be based on the number of wavelengths or frequency channels of the AWG, and the wavelength channel spacing of the AWG.

In some examples, the different coarse bands 202, 204, 206, and 208 can correspond to different colors (e.g. blue, red, yellow, green). In other examples, the different coarse bands can correspond to other wavelength ranges.

Figure 3:
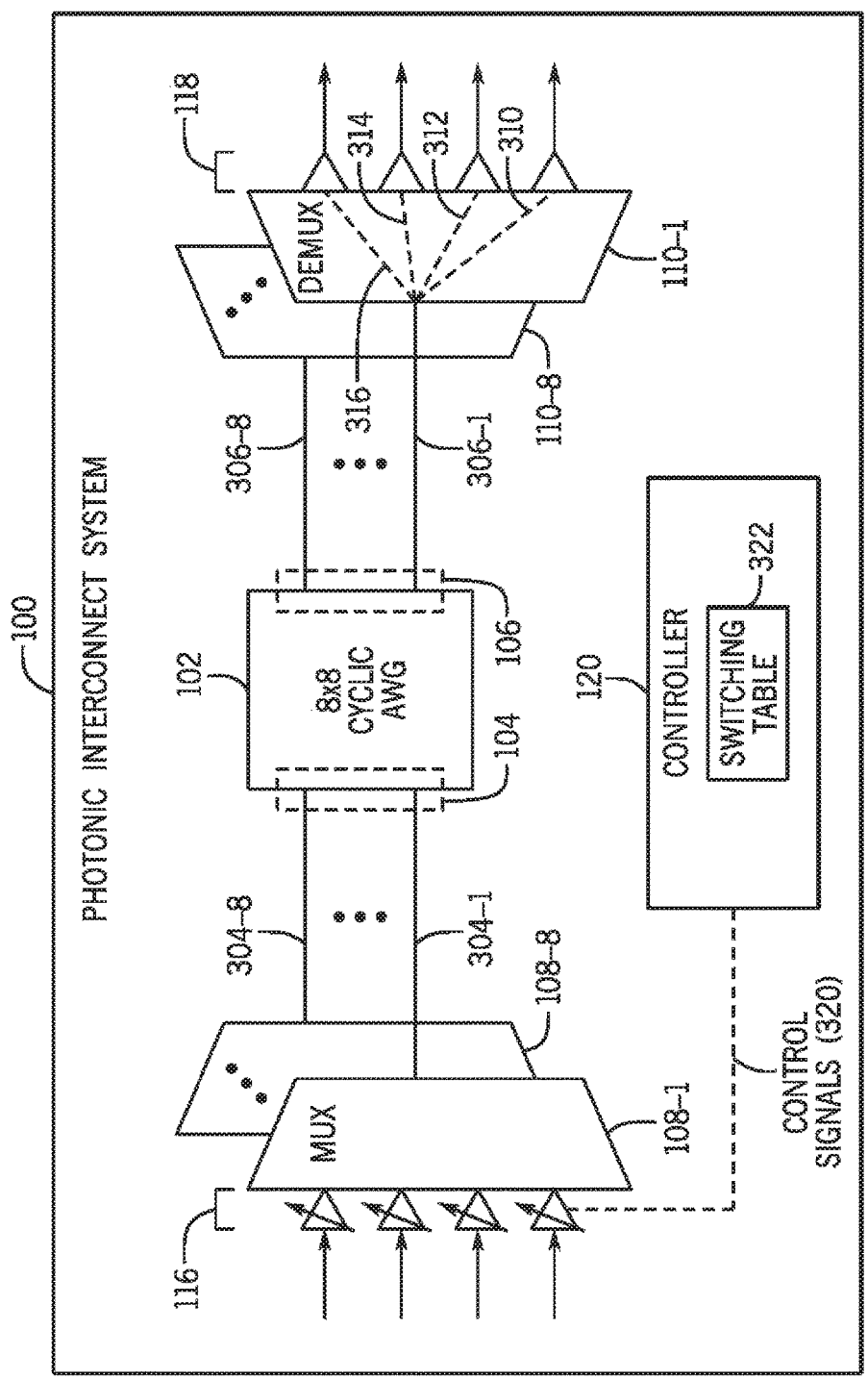
FIG. 3 is a block diagram of another example photonic interconnect system according to further implementations.

FIG. 3 shows an example photonic interconnect system 100 according to further implementations. In the example of FIG. 3, it is assumed that the cyclic AWG 102 is an 8×8 cyclic AWG. According to the example of FIG. 3, N=8 and M=4.

In FIG. 3, eight multiplexers 108-1 to 108-8 are depicted. Each multiplexer 108-$j$ (j=1 to 8) performs 4:1 multiplexing, by multiplexing four inputs to one output. The four inputs of each multiplexer 108-$j$ receive input optical signals from a respective set of four tunable light devices 116. Each multiplexer 108-$j$ is coupled to a respective different set of four tunable light devices 116. In the example of FIG. 3, 32 tunable light devices 116 are provided.

The outputs of the multiplexers 108-1 to 108-8 are coupled to respective optical paths 304-1 to 304-8. In other words, the output of each multiplexer 108-$j$ is coupled to a respective optical path 304-$j$. Each optical path 304-$j$ can be implemented with an optical fiber or an optical waveguide. The optical paths 304-1 to 304-8 are coupled to respective inputs 104 of the cyclic AWG 102.

The multiplexing performed by each multiplexer 108-$j$ can include wave-division multiplexing (WDM), where a number of optical signals of different wavelengths are multiplexed onto a common optical path (304-$j$). An optical signal communicated along an optical path 304-$j$ can be referred to as a WDM optical signal, which carries four input optical signals of different wavelengths produced by a respective set of tunable light devices 116 coupled to the inputs of the XMIT unit 302-$j$.

Each optical path 304-$j$ carries multiple source channels of different wavelengths, where a source channel refers to the wavelength of a corresponding input optical signal produced by a respective tunable light device 116.

The outputs 106 of the cyclic AWG 102 are coupled to respective eight optical paths 306-1 to 306-8. Each optical path 306-j also carries a WDM signal that has multiple optical signals of different wavelengths. Each WDM signal transmitted over a respective optical path 306-j is received by a respective demultiplexer 110-j. Eight demultiplexers 110-1 to 110-8 are depicted. Each demultiplexer 110-j has one input and four outputs, and performs 1:4 demultiplexing.

The four outputs of the demultiplexer 110-j are coupled to respective OE converters 118, to convert output optical signals from the demultiplexers to output electrical signals. In the example according to FIG. 3, where M=4 and N=8, there are 32 OE converters 118.

In some implementations, the cyclic AWG 102 performs fine band selection, by selecting a path based on wavelengths in the fine bands. Each demultiplexer 110 performs coarse band selection, where a path through a demultiplexer 110-j is selected based on which of the coarse bands 202, 204, 206, and 208 an input optical signal is part of.

As depicted in FIG. 3, each demultiplexer 110-j has four paths 310, 312, 314, and 316. An optical signal received at the input of the demultiplexer 110-j is routed along a selected one of the four paths 310, 312, 314, and 316, based on which coarse band the wavelength of the optical signal falls into. Thus, if the optical signal has a wavelength in a first coarse band, then the optical signal is routed along path 310; if the optical signal has a second wavelength that falls into a second coarse band, then the optical signal is routed along path 312; if the optical signal has a third wavelength that falls into a third coarse band, then the optical signal is routed along path 314; and if the optical signal has a fourth wavelength that falls into a fourth coarse band, then the optical signal is routed along path 316. Stated differently, each demultiplexer 110-j separates spatially coarse bands of light.

In the example according to FIG. 3, the controller 120 provides control signals 320 to the tunable light devices 116, to vary the wavelength of an optical signal produced by each tunable light device 116 to any one of 32 distinct wavelengths (such as the wavelengths depicted in FIGS. 2A and 2B) to direct an optical signal to a target output of the photonic interconnect system 100.

More generally, the controller 120 is able to tune a tunable light device 116 to any of M×N distinct wavelengths to distribute an optical signal from any input (of M×N inputs) of the photonic interconnect system 100 to any output (of M×N outputs) of the photonic interconnect system 100.

The controller 120 can be implemented as a combination of machine-executable instructions and processing hardware, such as a microprocessor, a core of a microprocessor, a microcontroller, an application specific integrated circuit (ASIC) device, a programmable gate array (PGA), and so forth. In other examples, the controller 120 can be implemented with just processing hardware.

As further shown in FIG. 3, the controller 120 includes a switching table 322 that is used by the controller 120 to decide wavelengths to which respective tunable light devices 116 are tuned, based on which output 113 of the photonic interconnect system 100 is the target output. The switching table 322 is populated with wavelength values indicating wavelengths for distributing optical signals received at corresponding inputs 111 to respective outputs 113 of the photonic interconnect system 100. For example, an entry in the switching table 322 can include a wavelength value specifying a particular wavelength to which a respective tunable light device 116 is to be tuned to pass a signal received at input k (k=1 to M×N) of the photonic interconnect system 100 to an output p (p=1 to M×N). Different entries of the switching table 322 correspond to different pairs of inputs and outputs of the photonic interconnect system 100.

The wavelength values programmed into the switching table 322 can be provided by a user, or alternatively, can be learned by the controller 120 based on specifications of the cyclic AWG 102, including channel spacings and other characteristics of the cyclic AWG 102. In other examples, the values in the switching table 322 can be learned using a program that tests a system by tuning each specific tunable laser device 116 to each wavelength and by observing when each specific optical receiver (OE converter 118) has a strong signal that passes from a specific tunable laser device 116 to a particular output.

In some examples, the photonic interconnect system 100 can be used to implement a Clos network, which is a multi-stage network that includes an input stage, a middle stage, and an output stage. In the photonic interconnect system 100, the input stage includes the multiplexer 108, the middle stage includes the cyclic AWG 102, and the output stage includes the demultiplexer 118. The photonic interconnect system 100 can implement a non-blocking Clos network, which refers to a Clos network where an unused input at the input stage can be connected to any unused output at the output stage. In implementations where the multiplexer 108 performs WDM, the Clos network can be referred to as a wave-division multiplexed Clos (WDMC) network.

In other examples, the photonic interconnect system 100 can be used to implement other types of optical networks.

Figure 4:
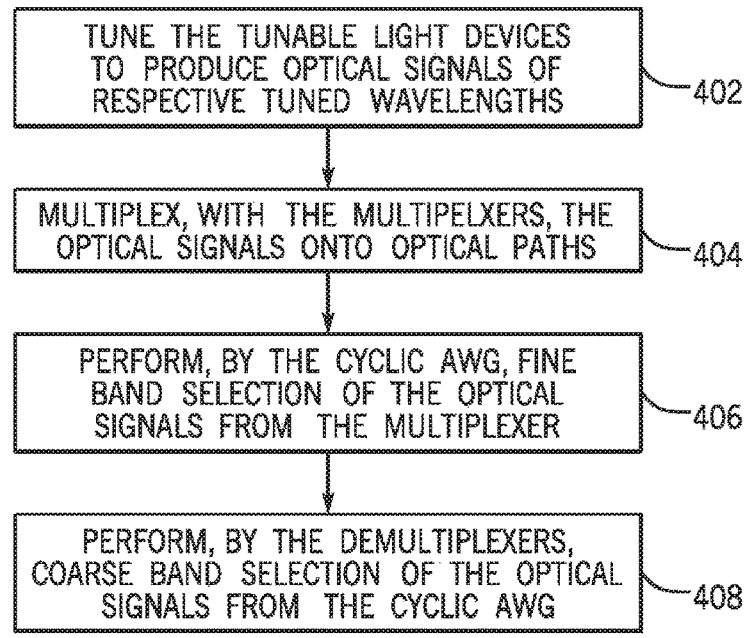
FIG. 4 is a flow diagram of a process according to some implementations.

FIG. 4 is a flow diagram of an example process according to some implementations. The process can be performed in a photonic interconnect system, such as the photonic interconnect system 100.

The tunable light devices 116 in the photonic interconnect system 100 are controllably tuned (at 402) to produce optical signals of respective tuned wavelengths, the respective tuned wavelengths selected from wavelengths in fine wavelength bands of respective coarse wavelength bands, where each of the coarse wavelength bands includes a respective group of fine wavelength bands (as shown in FIGS. 2A-2B).

The multiplexers 108 multiplex (at 404) the optical signals onto optical paths to the cyclic AWG 102. The cyclic AWG 102 performs (at 406) fine band selection of the optical signals received over the optical paths, where a path of a given optical signal of the optical signals through the cyclic AWG 102 is based on which of the fine wavelength bands the tuned wavelength of the given optical signal is part of.

The demultiplexers 118 perform (at 408) coarse band selection of the optical signals received from the cyclic AWG, where a path of the given optical signal through a respective demultiplexer is based on which of the coarse bands the wavelength of the given optical signal is part of, the respective demultiplexer having different paths that map to different ones of the coarse wavelength bands By using the photonic interconnect system 100 according to some implementations, the design of a photonic interconnect system is simplified to achieve cost reduction in implementing switches in an optical network. The cyclic AWG 102 of the photonic interconnect system 100 can be implemented with a single AWG device (which includes a substrate onto which optical elements are provided to form the cyclic AWG 102), such that the number of components used can be reduced. Moreover, by using the multiplexers 108 and demultiplexers 110 according to some implementations, the number of optical paths to and from the cyclic AWG 102 is reduced such that the number of optical fibers or optical waveguides used in an optical network can be reduced.

Figure 5:
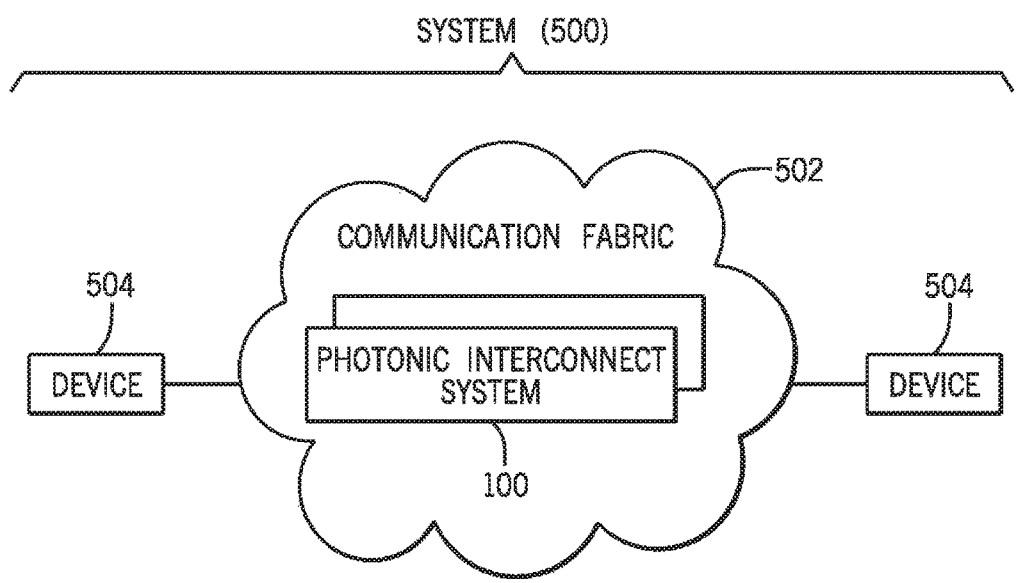
FIG. 5 is a block diagram of a system according to some implementations.

FIG. 5 is a block diagram of an example system 500 according to some implementations. The system 500 includes a communication fabric 502 (or network) that includes one or multiple photonic interconnect systems 100. The multiple photonic interconnect systems 100 can be connected in parallel, connected in sequence, or connected in another arrangement.

Devices 504 are coupled to the communication fabric 502 to communicate with each. Signals sent by a source device 504 are passed through the photonic interconnect system(s) 100, and routed to destination device 504.

Figure 6:
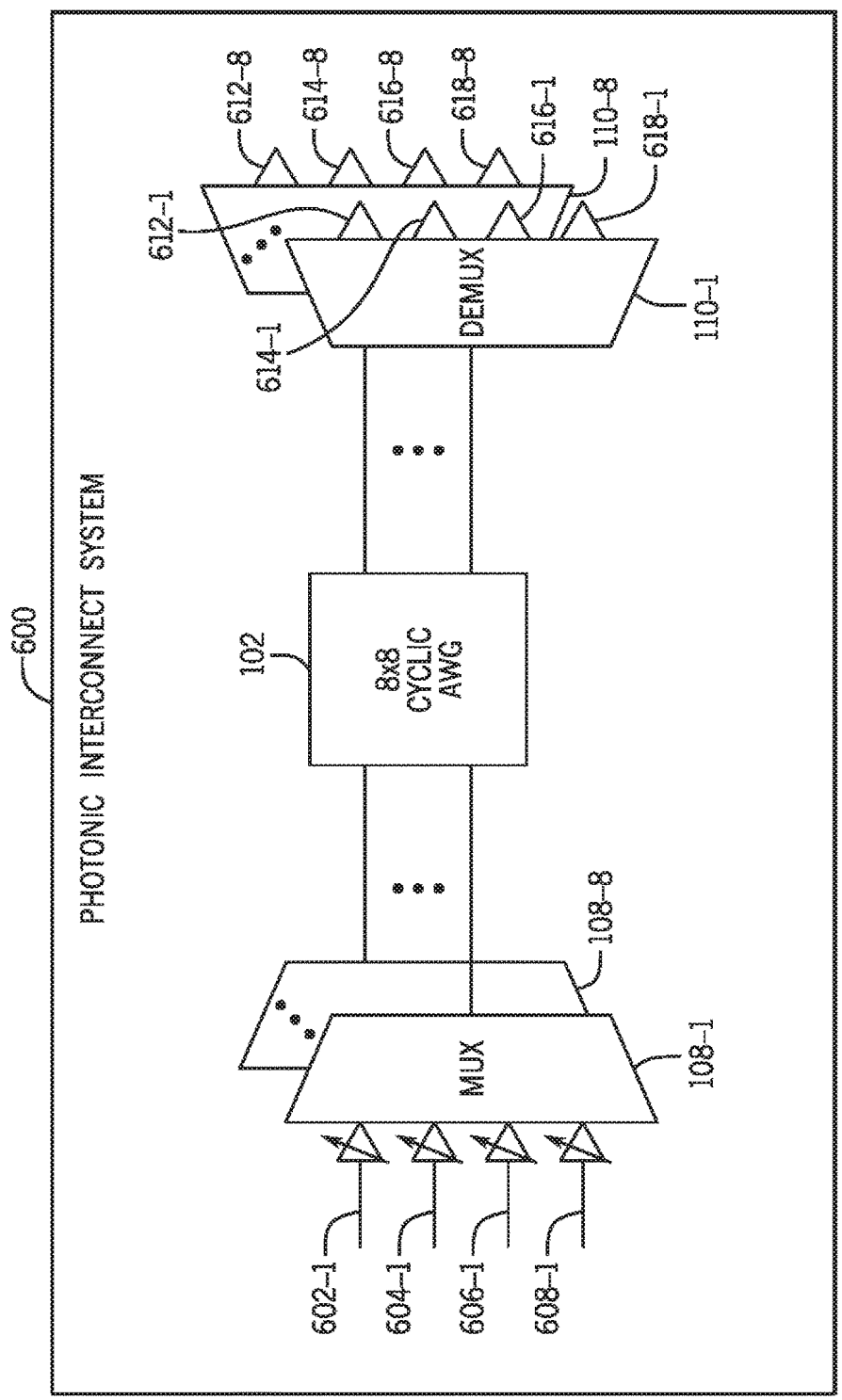
FIG. 6 is a block diagram of a further example photonic interconnect system according to alternative implementations.

In examples according to FIGS. 1 and 3, it is assumed that each tunable light device 116 can be tuned to any of the M×N wavelengths in the different coarse bands 202, 204, 206, and 208 (and the fine bands in each of the respective coarse bands). In alternative implementations, each tunable light device 116 can be restricted to tune between a specific band, such as to wavelengths within a corresponding coarse band. In a photonic interconnect system 600 as shown in FIG. 6, a multiplexer 108-$j$ is coupled to a respective set of tunable light devices 602-$i$, 604-$i$, 606-$i$, and 608-$i$. Eight tunable light devices 602-1 to 602-8 are coupled to first inputs of respective multiplexers 108-1 to 108-8, eight tunable light devices 604-1 to 604-8 are coupled to second inputs of respective multiplexers 108-1 to 108-8, eight tunable light devices 606-1 to 606-8 are coupled to third inputs of respective multiplexers 108-1 to 108-8, and eight tunable light devices 608-1 to 608-8 are coupled to fourth inputs of respective multiplexers 108-1 to 108-8.

Each tunable light device 602-$i$ can perform tuning to just wavelengths within the first coarse band. In other words, a tunable light device 602-$i$ is unable to tune to wavelengths outside the first coarse band. Similarly, each tunable light device 604-$i$ can be tuned to just wavelengths in a second coarse band, each tunable light device 606-$i$ can be tuned to just wavelengths in a third coarse band, and each tunable light device 608-$i$ can be tuned to just wavelengths in a fourth coarse band.

Multiple types of tunable light devices can be used to enhance the total range, the number of coarse tuning bands, and the total number of outputs. Alternatively, multiple types of tunable light devices can be used to reduce costs for acquiring optical signals of respective wavelengths.

The operations of the multiplexers 108-1 to 108-8, the cyclic AWG 102, and the demultiplexers 110-1 to 110-8 are the same as discussed above. The outputs of the demultiplexers 110-1 to 110-8 are coupled to respective OE converters. First outputs of the demultiplexers 110-1 to 110-8 are coupled to respective OE converters 612-1 to 612-8, second outputs of the demultiplexers 110-1 to 110-8 are coupled to respective OE converters 614-1 to 614-8, third outputs of the demultiplexers 110-1 to 110-8 are coupled to respective OE converters 616-1 to 616-8, and fourth outputs of the demultiplexers 110-1 to 110-8 are coupled to respective OE converters 618-1 to 618-8.

Because the tunable light devices of FIG. 6 are restricted to tuning in respective coarse bands, the ability to distribute signals through the photonic interconnect system 600 of FIG. 6 is also restricted. Input signals received by the tunable light devices 602-1 to 602-8 can only be distributed to the OE converters 612-1 to 612-8, input signals received by the tunable light devices 604-1 to 604-8 can only be distributed to the OE converters 614-1 to 614-8, and so forth.

According to the arrangement of FIG. 6, four separate 8×8 optical circuit switches are provided in the photonic interconnect system 600, where in each of the 8×8 optical circuit switches, the eight wavelengths within a specific coarse band can be switched to any of eight outputs.

Figure 7:
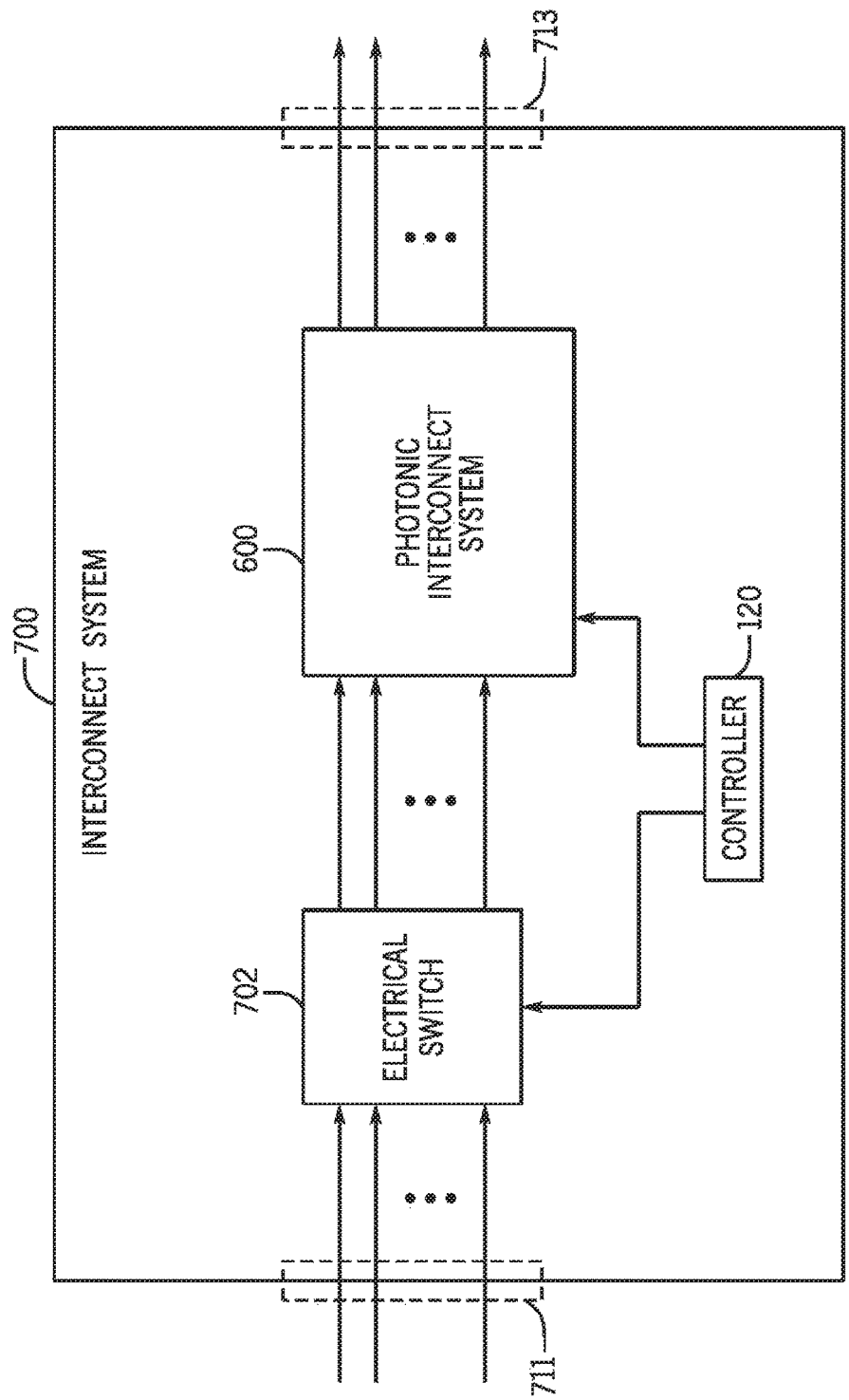
FIG. 7 is a block diagram of an example interconnect system according to some implementations.

FIG. 7 shows an interconnect system 700 according to alternative implementations. The interconnect system 700 includes the photonic interconnect system 600 of FIG. 6. In addition, the interconnect system 700 includes an electrical switch 702 connected to the inputs of the photonic interconnect system 600. The electrical switch 702 can be controlled by the controller 120, to allow an input signal at any input of the electrical switch 702 to be routed to any output of the electrical switch 702. The inputs to the electrical switch 702 are connected to inputs 711 of the interconnect system 700.

Use of the electrical switch 702 addresses the restrictive distribution of optical signals of the photonic interconnect system 600. With the combination of the electrical switch 702 and the photonic interconnect system 600, an input signal at any input 711 of the interconnect system 700 can be directed to any output 713 of the interconnect system 700.

Coarse band selection for an input signal is provided using the electrical switch 702 to select a tunable light device of the photonic interconnect system 600 that can tune over a target coarse band. The fine band selection is performed by the respective tunable light device in the photonic interconnect system 600.

In other implementations, instead of providing the electrical switch 702 at the input to the photonic interconnect system 600, an electrical switch can be provided at the output of the photonic interconnect system 600.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A photonic interconnect apparatus, comprising:
   a plurality of tunable light devices to receive input signals;
   multiplexers to multiplex optical signals produced by the tunable light devices onto optical paths;
   a cyclic arrayed waveguide grating (AWG) to receive the optical signals over the optical paths, and to direct a given optical signal of the received optical signals to a selected output of a plurality of outputs of the cyclic AWG based on a wavelength of the given optical signal;
   demultiplexers coupled to the plurality of outputs of the cyclic AWG, a respective demultiplexer of the demultiplexers to direct the given optical signal to a selected output of a plurality of outputs of the respective demultiplexer according to which coarse wavelength band the wavelength of the given optical signal is part of;
   a controller to provide control signals to the plurality of tunable light devices to selectively tune the tunable light devices; and
   an electrical switch between inputs of the photonic in apparatus and inputs of the plurality of tunable light devices, wherein the controller is to control the electrical switch to selectively distribute signals received at the inputs of the photonic interconnect apparatus to selected tunable light devices of the plurality of tunable light devices.

2. The photonic interconnect apparatus of claim 1, wherein the coarse wavelength band comprises a bandwidth of at least one free spectral range of the cyclic AWG.

3. The photonic interconnect apparatus of claim 1, wherein different coarse bands correspond to respective different paths through the respective demultiplexer, and each of the coarse wavelength bands includes a plurality of fine wavelength bands.

4. The photonic interconnect apparatus of claim 3, wherein each of the plurality of tunable light devices is tunable to selectively produce an optical signal at a wavelength that is selected from wavelengths in the fine wavelength bands in a respective one of the coarse wavelength bands.

5. The photonic interconnect apparatus of claim 1, wherein the multiplexers, the cyclic AWG, and the demultiplexers are passive devices that are not actively controlled to switch the input signals to outputs of the photonic interconnect apparatus.

6. The photonic interconnect apparatus of claim 1, wherein the selected output of the cyclic AWG to which the given optical signal is directed is based on a fine wavelength band selection performed by the cyclic AWG based on the wavelength of the given optical signal within the coarse band, wherein different wavelengths in fine wavelength bands of the coarse band map to different outputs of the plurality of outputs of the cyclic AWG.

7. The photonic interconnect apparatus of claim 1, wherein the controller is to tune a first of the plurality of tunable light devices to a particular wavelength of a plurality of wavelengths based on which output of the demultiplexers is a destination of an input signal received by the first tunable light device.

8. The photonic interconnect apparatus of claim 1, wherein by tuning the plurality of tunable light devices, the controller is to selectively route an input signal received at any of inputs of the photonic interconnect apparatus to any of outputs of the photonic interconnect apparatus.

9. The photonic interconnect apparatus of claim 1, wherein the plurality of tunable light devices include multiple groups of tunable light devices, a first of the multiplexers to combine outputs of a first group of the multiple groups of tunable lights devices into a wave division multiplexed (WDM) optical signal provided over a first of the optical paths to the cyclic AWG.

10. The photonic interconnect apparatus of claim 1, wherein the cyclic AWG has a plurality of inputs each associated with a respective different cyclic distribution pattern that maps different wavelengths to different outputs of the cyclic AWG, the cyclic AWG to direct optical signals received at a first input of the plurality of inputs to respective different outputs of the cyclic AWG according the respective cyclic distribution pattern for the first input.

11. The photonic interconnect apparatus of claim 1, wherein a first of the tunable light devices is tunable across a bandwidth of a first coarse band of the cyclic AWG, and a second of the tunable light devices is tunable across a bandwidth of a second coarse band of the cyclic AWG.

12. A method comprising:
tuning, by a photonic interconnect system, tunable light devices to produce optical signals of respective tuned wavelengths, the respective tuned wavelengths selected from wavelengths in fine wavelength bands of respective coarse wavelength bands, each of the coarse wavelength bands including a respective group of fine wavelength bands;
multiplexing, by multiplexers, the optical signals onto optical paths;
performing, by a cyclic arrayed waveguide grating (AWG), fine band selection of the optical signals received over the optical paths, wherein a path of a given optical signal of the optical signals through the cyclic AWG is based on which of the fine wavelength bands the tuned wavelength of the given optical signal is part of;
performing, by demultiplexers, coarse band selection of the optical signals received from the cyclic AWG, wherein a path of the given optical signal through a respective demultiplexer of the demultiplexers is based on which of the coarse bands the wavelength of the given optical signal is part of, the respective demultiplexer having different paths that map to different ones of the coarse wavelength bands;
selectively distributing, by a controller, signals received at inputs of the photonic interconnect system to selected tunable light devices of the tunable light devices.

13. A system comprising:
at least one photonic interconnect system comprising:
a controller;
tunable light devices controllable by the controller to tune optical signals produced by the tunable light devices to respective wavelengths;
multiplexers to perform wavelength-division multiplexing of the optical signals onto respective optical paths;
a cyclic arrayed waveguide grating (AWG) to apply fine band selection to selectively distribute the optical signals from the multiplexers along different paths of the cyclic AWG depending on which of a plurality of fine wavelength bands the wavelengths of the optical signals fall into;
demultiplexers to perform to apply coarse band selection to selectively direct the optical signals received from the cyclic AWG along different paths of the demultiplexers depending on which of a plurality of coarse wavelength bands the wavelengths of the optical signals fall into;
an electrical switch between inputs of the photonic interconnect system and inputs of the tunable light devices, wherein the controller is to control the electrical switch to selectively distribute signals received at the inputs of the photonic interconnect system to selected tunable light devices of the tunable light devices.

* * * * *